March 22, 1938.     H. J. HORN     2,111,779
WHEEL
Filed Sept. 6, 1932
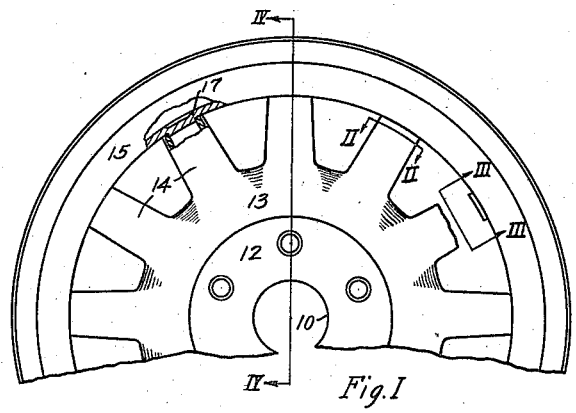
Fig. I
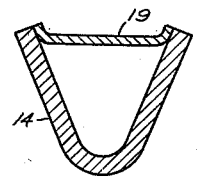
Fig. II
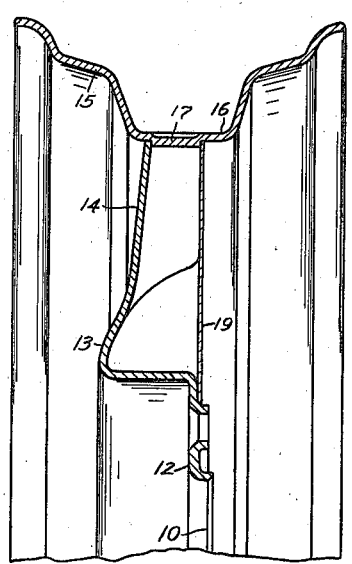
Fig. IV
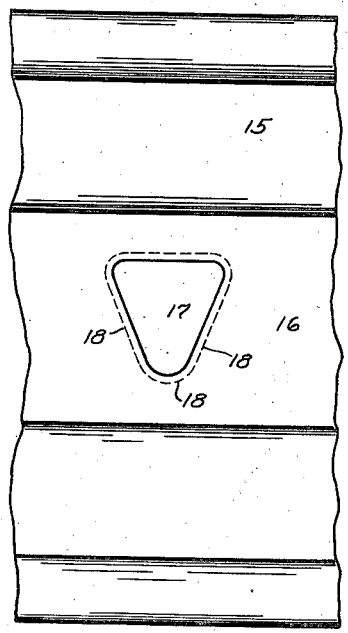
Fig. III
INVENTOR.
Harry J. Horn.
BY Carroll R. Taber
HIS ATTORNEY.

Patented Mar. 22, 1938

2,111,779

UNITED STATES PATENT OFFICE 2,111,779

WHEEL

Harry J. Horn, Lansing, Mich., assignor to Motor Wheel Corporation, Lansing, Mich., a corporation of Michigan Application September 6, 1932, Serial No. 631,748

2 Claims. (Cl. 301—9)

This invention relates to wheels and more particularly to wheels embodying a metallic spoke spider.

The principal object of the invention is the provision of means for securing a rim upon the spoke ends of a metallic spoke spider. Another object is the provision of a reinforcing plate for a unitary sheet metal spoke spider which is also adapted to lock a rim in position upon the spoke ends.

Various means have been used heretofore for securing rims upon the spoke ends of a metallic spoke spider including riveting, welding, and forming depressions or projections in the rim adapted to engage openings in the spokes. In the wheel constructions heretofore embodying a rim provided with depressions adapted to fit into openings in the spoke ends, it has been necessary to form the depressions in the rim after the rim was mounted upon the spokes or to expand the spokes radially whereby the spoke ends would encompass the depressions carried by the rim. In other words, this type of construction has been used only in wheels embodying tubular spokes.

The present invention provides a wheel assembly embodying a plurality of channel spokes, preferably V shape in cross section and a rim provided with substantially wedge shaped projections adapted to be pressed laterally into engagement with the spoke ends. The projections are then welded to the inner surface of the spoke ends whereby the securing means is completely concealed when the wheel is viewed from the closed side of the spokes.

The wheel embodying the present invention preferably includes a unitary spoke spider formed from a single sheet metal stamping. Where such a spoke spider is provided with an axially extending hub shell portion integrally connected to the base of the radially extending spokes, considerable strain is placed upon the spoke spider along the line of joinder between the hub shell portion and the spokes. This portion of the spider may be strengthened by securing a reinforcing plate to the open side of the spoke spider.

Where a reinforcing plate is used, it also serves to close or seal the open side of the spokes and may also, if desired, be utilized for securing the rim upon the spoke ends by confining the rim projections within the V shaped spoke ends. While the welding of the projections to the inner surface of the spoke ends may be dispensed with when a reinforcing plate is used, it is preferred to use the reinforcing plate as a supplementary means for locking the rim upon the spoke ends.

For a better understanding of the invention reference may be had to the following description taken in connection with the accompanying drawing, in which:

Figure I is a partial side view in elevation of a vehicle wheel embodying the present invention with parts broken away to more clearly illustrate the manner in which the rim is secured to the spoke ends.

Figure II is a cross sectional view of one of the spokes taken on substantially the line II—II of Figure I.

Figure III is a plan view of a portion of the rim looking in the direction of the inner surface of the rim looking in the direction of the arrows III—III in Figure I; and Figure IV is a cross sectional view taken on substantially the line IV—IV of Figure I.

The vehicle wheel herein shown as embodying the present invention consists of a unitary metallic spider 10 preferably formed from sheet metal. The unitary spoke spider includes a hub attaching flange 12, an axially extending hub shell portion 11, a central body portion 13, and a plurality of radially extending channel spokes 14. A rim 15 is mounted upon the spoke ends in a manner which will be described presently. The spokes 14, as best shown in Figure II, are preferably V-shaped in cross section, closed at one side and open at the other.

The base 16 of the rim 15 is provided with a plurality of wedge shaped depressions 17 suitably spaced to coincide with the ends of the spokes 14. The depressions 17 are preferably of the same formation as the spoke ends whereby the spoke ends snugly engage the depressions when the rim is positioned upon the spokes.

The rim is mounted upon the spokes by pressing the same laterally toward the spokes from the open side thereof whereby the depressions 17 enter into the spoke ends and contact the inner surface thereof. In this construction any slight variation in the respective circumferences of the spoke spider and the rim are not objectionable as contact will be made between the depressions 17 and the inner wall of the spoke ends in any event.

The rim is preferably secured to the spoke spider by welding the sides of the depression 17 at the points indicated at 18 in Figure III to the contacting portions of the inner surface of the spoke ends. By welding the depressions to the inner surface of the spoke ends the securing means is concealed when viewing the wheel from the closed side of the spokes.

The depressions 17 are here shown as being wedge shaped and integral with the rim 15. Any other shape desired may be utilized but it is preferable that the depressions be of substantially the same outline as the cross section of the spokes. Likewise, the integral depressions may be dispensed with and suitable projections or lugs may be secured to the inner surface of the base of the rim.

A reinforcing plate 19 is here shown as being welded to the back of the spoke spider 10 along the edge of the spokes 14 and to the hub attaching flange 12. The reinforcing plate closes the open side of the spokes and is cut away between the spokes to preserve the spoked appearance indicated in Figure I. This strengthens the spoke spider and relieves much of the strain which would be placed upon the central portion 13 if the reinforcing plate were not used.

In addition to strengthening the spoke spider 10, the reinforcing plate 19 may also serve as a means for locking the rim in position upon the spoke ends. For this purpose the plate 19 may be welded to the base of the wedge shaped depressions 17 or may be pressed snugly against the base of the wedge. If desired the welding of the depressions 17 to the inner surface of the spokes 14 may be dispensed with entirely, in which event the reinforcing plate 19 will provide the sole means for securing the rim 15 in position upon the spoke ends. In any event the rim 15 is preferably permanently attached to the spoke ends.

From the foregoing description is will be apparent that the present invention when utilized in combination with a unitary metallic spoke spider provides a simple and inexpensive but extremely durable wheel construction in which the difficulties heretofore experienced in fitting a rim to the spoke spider are eliminated. While only the preferred form of the invention has been herein shown and described it should be understood that the same is not limited thereto but is coextensive with the scope of the appended claims.

I claim:

1. A vehicle wheel including in combination a unitary sheet metal spoke spider comprising a plurality of radially extending curved spokes open at one side and closed at the other side, an axially extending hub shell portion, and a radially extending hub attaching flange, a rim, depressions in the rim fitted into the spoke ends, and a reinforcing plate secured to the open side of the spokes and the hub attaching flange whereby to lock the rim in position upon the spoke ends and strengthen the spoke spider.

2. An artillery steel wheel comprising a main load front spider including spoke portions and a nave merging into a rearwardly extending annulus having a bolting-on flange, and a rear spider including spoke portions cooperating with the spoke portions of the front spider to form tubular composite spokes and embodying an annulus radially inwardly of its spoke portions having a radially inner margin secured in side surface relation to the front spider.

HARRY J. HORN.